(12) United States Patent
Luster

(10) Patent No.: US 7,483,183 B2
(45) Date of Patent: Jan. 27, 2009

(54) LINEAR OPTICAL SCANNER

(75) Inventor: Spencer D. Luster, Toledo, OH (US)

(73) Assignee: Light Works, Toledo, OH (US)

( * ) Notice: Subject to any disclaimer, the term of this patent is extended or adjusted under 35 U.S.C. 154(b) by 1176 days.

(21) Appl. No.: 10/380,134

(22) PCT Filed: Sep. 7, 2001

(86) PCT No.: PCT/US01/28008

§ 371 (c)(1),
(2), (4) Date: Mar. 11, 2003

(87) PCT Pub. No.: WO02/23228

PCT Pub. Date: Mar. 21, 2002

(65) Prior Publication Data

US 2004/0012826 A1    Jan. 22, 2004

Related U.S. Application Data

(60) Provisional application No. 60/232,475, filed on Sep. 13, 2000.

(51) Int. Cl.
*H04N 1/04* (2006.01)

(52) U.S. Cl. ................................. 358/475; 358/474
(58) Field of Classification Search ................. 358/475, 358/474, 509, 505, 487, 506, 497, 494; 250/234–236, 250/216; 399/211, 212; 359/850, 857, 861; 382/312, 318, 319; 355/1, 40, 41
See application file for complete search history.

(56) References Cited

U.S. PATENT DOCUMENTS

| 3,911,213 | A |   | 10/1975 | Tregay et al. |
|-----------|---|---|---------|---------------|
| 3,924,061 | A |   | 12/1975 | Tregay et al. |
| 4,124,797 | A |   | 11/1978 | Himmel |
| 4,674,856 | A | * | 6/1987  | Hyodo et al. ............... 355/1 |
| 5,177,617 | A | * | 1/1993  | Tuhro ..................... 358/296 |
| 5,845,019 | A |   | 12/1998 | Yoshizawa et al. |

* cited by examiner

*Primary Examiner*—Cheukfan Lee
(74) *Attorney, Agent, or Firm*—Donald K. Wedding

(57) ABSTRACT

A linear optical scanner wherein the linear optical scanner is disposed between a lens and the image plane of the lens allowing the image from the lens to be optically shifted along one dimension, and permits the image from the lens to be shifted linearly without scan error.

14 Claims, 6 Drawing Sheets

LINEAR OPTICAL SCANNER

CROSS-REFERENCE TO RELATED APPLICATION

This application claims the benefit of U.S. Provisional Patent Application Ser. No. 60/232,475 filed Sep. 13, 2000.

FIELD OF THE INVENTION

The present invention relates to a linear optical scanner for use in scanning two dimensional and three dimensional objects, and more particularly to a linear optical scanner having a three-mirror configuration causing the image from a lens to be shifted across a linear array of one-dimensional detectors of a linear array camera.

BACKGROUND OF THE INVENTION

Prior art methods of scanning two-dimensional scenes with a linear array camera are mostly dependent on either physically moving or translating the object to be scanned, physically moving or translating the entire camera and lens assembly; or optically redirecting the field of view of the camera and lens. by use of a single rotating scanning mirror; or an assembly of multiple mirrors in a rotating or translating configuration.

In the first two cases, translation of either the object or the camera and lens requires moving relatively large masses over relatively long distances. Mechanical realization of these systems results in expensive and slow mechanisms. For the third case, mirror rotation introduces at least two forms of scan error. One form of scan error is non-linearity due to converting rotational motion into linear motion. The second form of scan error is defocusing due to a change in optical path length either between the object and lens or the lens and the image plane.

In general, for any prior art scanning mirror or prism system, one of the two scan errors described occurs and must usually be corrected in some manner such as with the use of additional moving correcting mirrors or with limited utility f-theta lenses.

Several techniques are currently available for optically scanning an object or scene. However, all known methods suffer either from scan errors, or require movement of relatively large masses.

An object of the present invention is to produce a linear array camera having a linear optical scanning device that allows theoretically perfect linear translation of an image without defocus or other scan errors.

Another object of the present invention is to produce a linear array camera having a linear optical scanning device that may be constructed having a smaller size than equivalent performance devices of prior art, and allows theoretically perfect linear scanning of a large object field.

Another object of the present invention is to produce a linear array camera having a linear optical scanning device whereby adaptation for use with a large variety of lens types and focal lengths is simplified.

Still another object of the present invention is to produce a linear array camera having a linear optical scanning device whereby insertion of the linear optical scanning device into the image space between a lens and a camera or detector, when used with lenses with long back focal lengths, is simplified.

SUMMARY OF THE INVENTION

The above, as well as other objects of the invention, may be readily achieved by a linear optical scanner comprising: a mirror assembly including a plurality of mirrors, each of the mirrors having a reflective surface; and a drive means operatively connected to the mirror assembly for mechanical translation of the mirror assembly.

BRIEF DESCRIPTION OF THE DRAWINGS

The above, as well as other objects, features, and advantages of the present invention will be readily apparent to those skilled in the art from reading the detailed description of the preferred embodiments of the present invention when considered in light of the accompanying drawings, in which.

DETAILED DESCRIPTION OF THE PREFERRED EMBODIMENT

Figure 1:
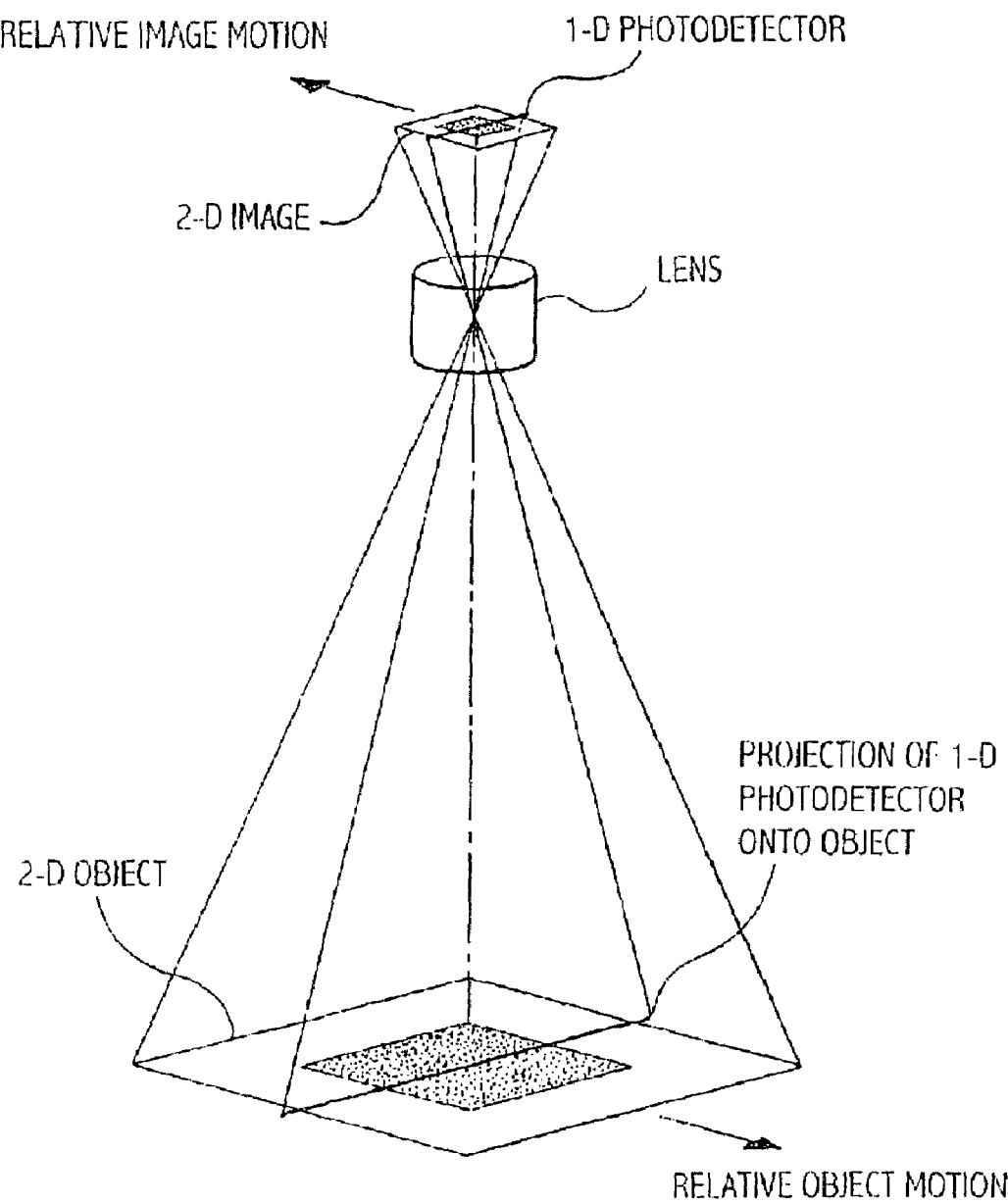
FIG. 1 is a schematic view illustrating a linear array camera requiring object or image motion relative to the linear array photo-detector.
Figure 2:
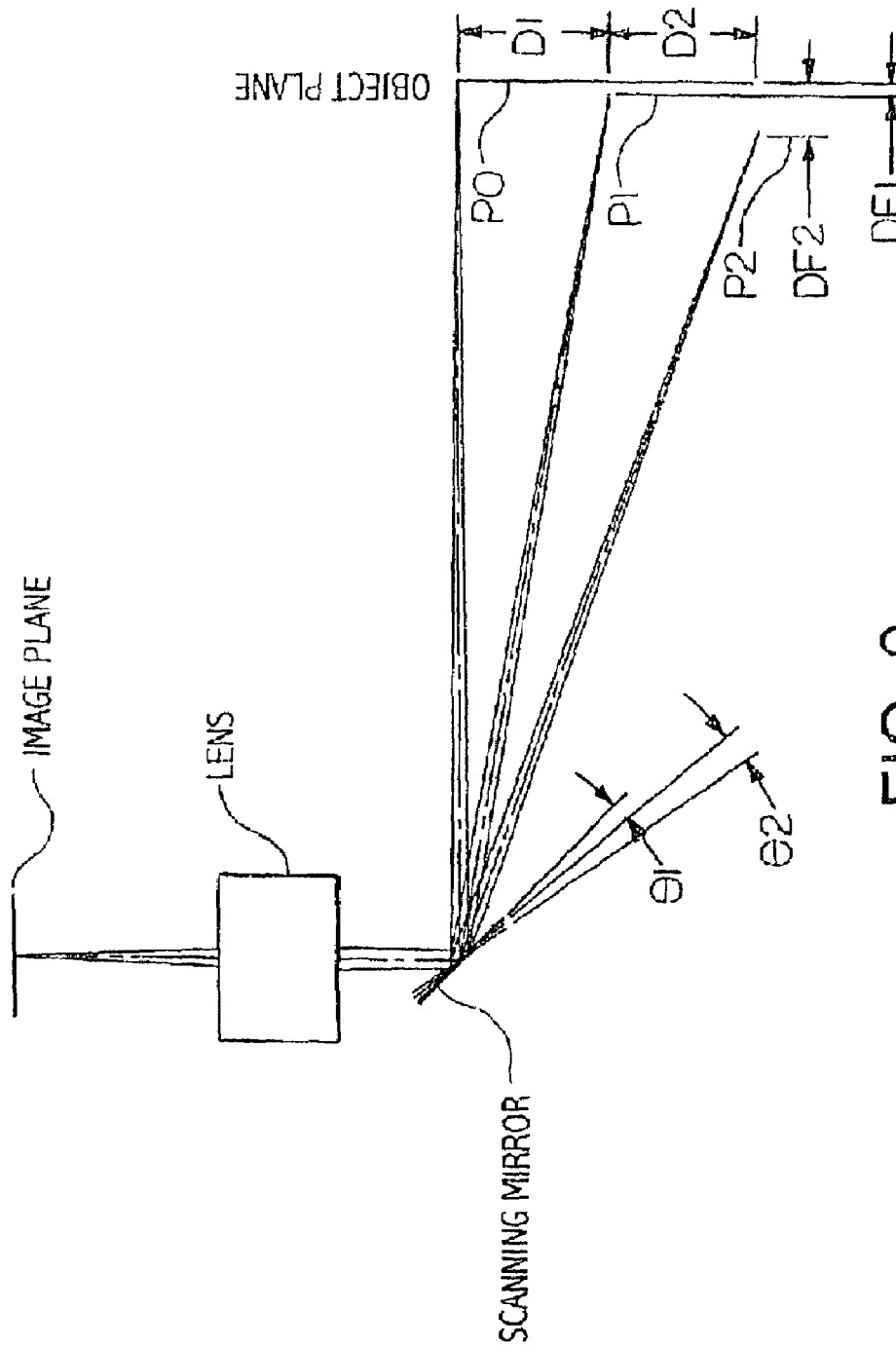
FIG. 2 is a schematic view of a linear optical scanner, illustrating two forms of scan error: non-linearity due to converting rotational motion into linear motion, and defocusing due to a change in optical path length between the object and lens or the lens and the image plane.

Referring to the drawings, FIGS. 1 and 2 illustrate the prior art showing the basic concept of requiring object or image motion relative to the linear array photo-detector. There is also disclosed two types of errors, specifically showing the effects with a single scanning mirror rotating about an axis into the plane of the page. The mirror is shown at three equally spaced angular positions with 1 being equal to 2. For each angular position, the point of best focus in object space is shown as p0, p1 and p2. The vertical distances between each of these points are not equal and in general change non-linearly as a function of the mirror angle . Likewise, the horizontal distances df1 and df2 from the object plane are shown to be non-zero, increasing non-linearly as increases.

Figure 3:
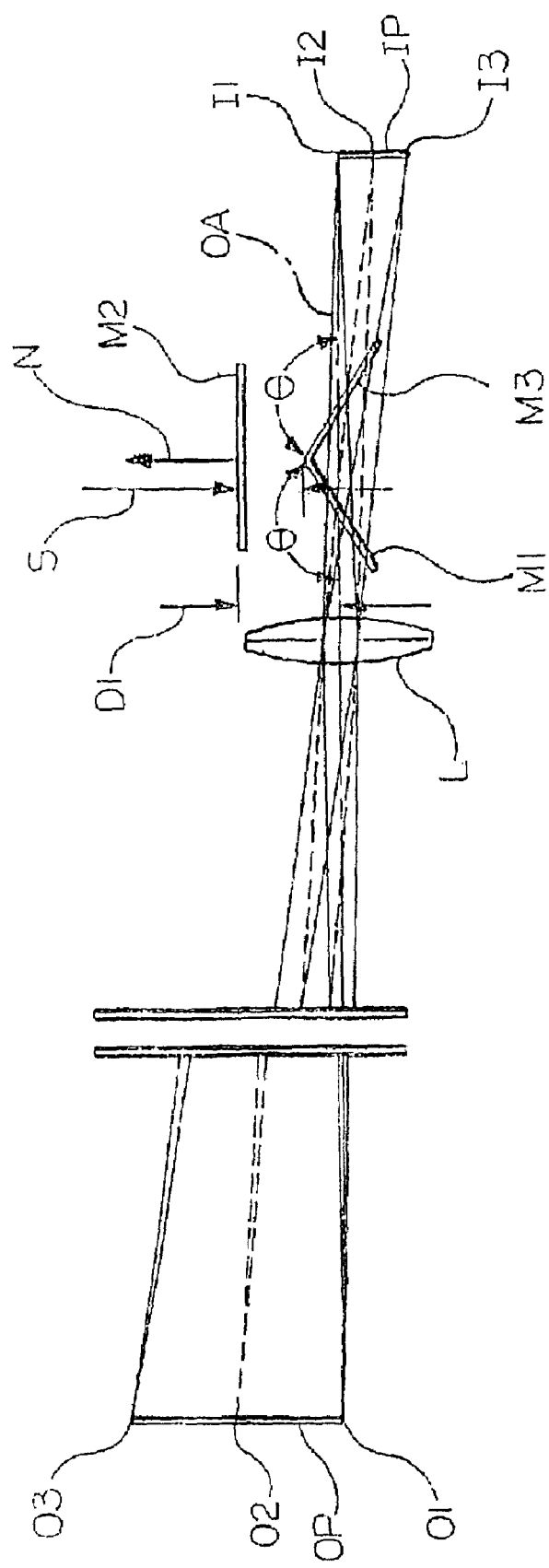
FIG. 3 is a schematic view of a linear optical scanner incorporating the three-mirror configuration of the present invention.

The present invention utilizes a simple three-mirror assembly in a configuration sometimes known as an Abbe k-mirror. FIG. 3 discloses such an assembly which is placed between a lens L, and the image plane IP of the lens. The three mirrors are arranged as follows: the reflecting plane of the first mirror M1 is disposed to make an angle with the optical axis OA of the lens. The reflecting plane of the second mirror M2 is parallel to the optical axis of the lens, and at a distance s from the upper edge of M1, as shown. The reflecting plane of the third mirror M3 is also disposed to make an angle with the optical axis, wherein the angle is equal in magnitude, but opposite in sign to the angle formed between the mirror M1 and the optical axis OA. Usually the upper edge of the mirror M3 is coincident with the upper edge of the mirror M1. Such a k-mirror assembly has previously been used to provide a means of rotating images in a manner similar to that of a Dove Prism. This is achieved by rotating the assembly about the optical axis OA. For the present invention, the k-mirror is translated only, and in a direction that is parallel or anti-parallel to the normal N of the single plane mirror M2.

Also shown in FIG. 3 are: object points O1, O2, and O3 that lie on the object plane OP; and conjugate image points I1, I2, and I3 that lie on the image plane IP as it would exist if the mirror assembly were not in place.

Figure 4:
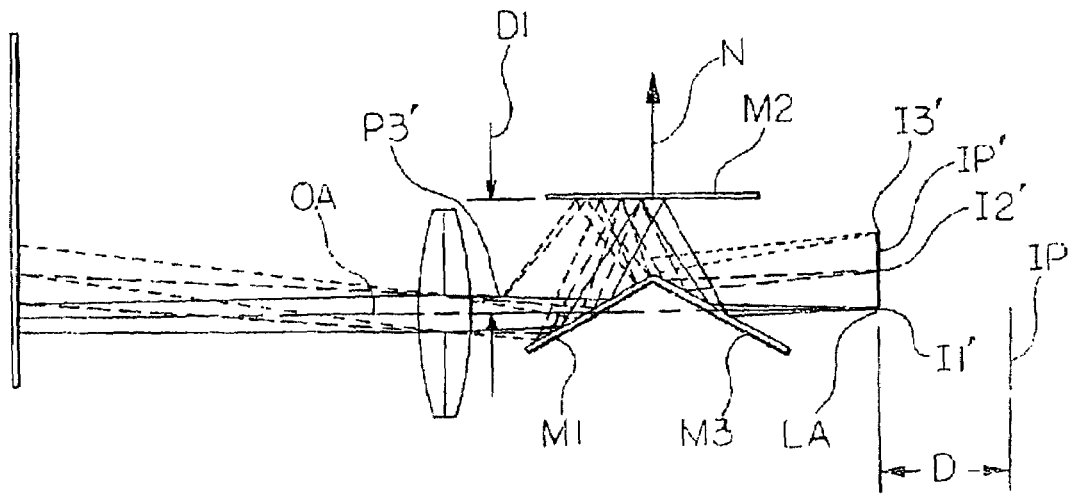
FIG. 4 is a schematic view of a linear optical scanner incorporating the features of the present invention whereby the mirror assembly is fixed at a distance dl from the optical axis.
Figure 5:
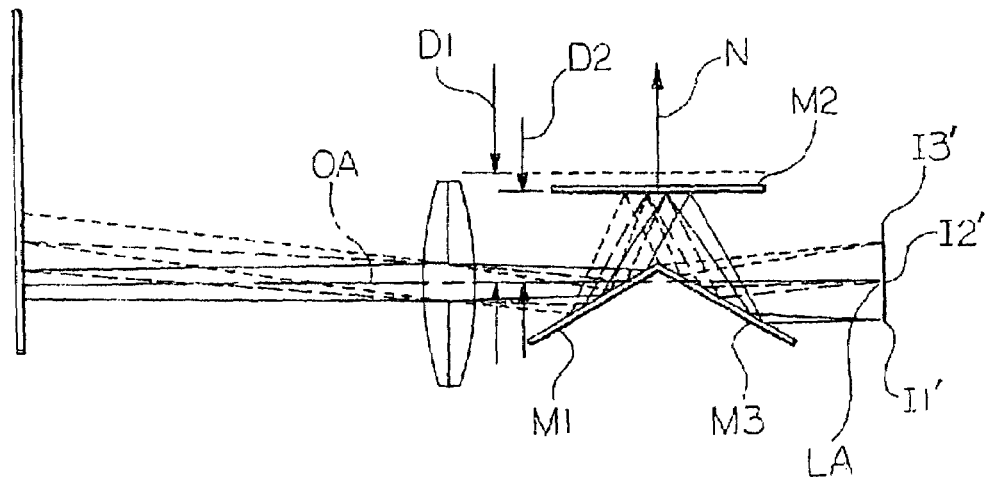
FIG. 5 is a schematic view of a linear optical scanner incorporating the features of the present invention whereby the mirror assembly is fixed at a second distance d2 from the optical axis.
Figure 6:
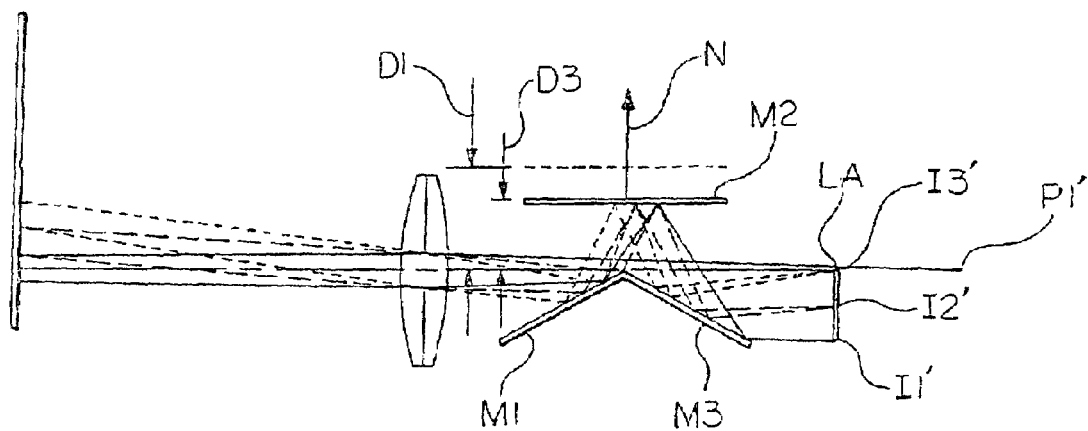
FIG. 6 is a schematic view of a linear optical scanner incorporating the features of the present invention whereby the mirror assembly is fixed at a third distance d3 from the optical axis.

In general, when such a mirror assembly is placed between a lens and an image plane and translated by a distance d in a direction that is parallel or anti-parallel to N, the image is shifted in the same direction, but by a distance that is exactly equal to twice d. FIGS. 4, 5, and 6 illustrate an example of the case for three different positions of the mirror assembly with the proper reflections from the mirrors being shown.

FIG. 4 shows the position of the mirror assembly where the distance in the N-direction from the mirror M2 to the optical axis OA is d1. In this case, the reflected path of the image space light rays is shown such that I1 still lies on the optical axis OA, but is translated a distance D from the original image plane IP onto a new image plane IP'. The new position is noted as I1' and is simply the result of the additional mechanical path length introduced by the k-mirror assembly. The image points I2 and I3 are likewise shown to be translated to the new image plane IP' and have been designated as I2' and I3'. In addition, the relative positions of all three new image points have been inverted.

It must be noted that in actual fact for the specific arrangement shown, the light rays contributing to I3' would not actually converge to the point shown. The I3' rays reflect from the mirrors M1 and M2, and then strike the mirror M1 again instead of the mirror M3, then the mirror M2 again, eventually converging to the real image point P3'. This is because the k-mirror assembly as represented is not large enough. The rays I3' are thus lost to the image plane IP'. Nevertheless, the gray lines are shown where these rays would have converged had they struck the mirror M3 immediately after being reflected from the mirror M2.

Also shown in FIG. 4 is the location of a possible linear array LA of photodetectors that is chosen to be coincident with I1'. The linear array LA is disposed such that the long axis of such a one-dimensional detector device is shown extending into the page. The type of detector has no receiving elements above or below the optical axis as shown. Thus, the loss of the rays I3' to the image plane IP' is irrelevant, as these rays do not contribute to detectable light for the illustrated position of the k-mirror.

FIG. 5 shows the mirror assembly having been moved anti-parallel to N so that the mirror M2 now lies a distance d2 from the optical axis OA. The distance moved, d1-d2, is chosen to be exactly half the distance between I1' and I2'. The reflected path of the image space light rays now shows that all three image points I1', I2', and I3' have been shifted anti-parallel to N by a distance equal to twice d1-d2, and the image point I2' is exactly coincident with the linear array LA.

Finally, FIG. 6 shows the mirror assembly having been moved anti-parallel to N so that the mirror M2 now lies a distance d3 from the optical axis OA. The distance moved d1-d3 is chosen to be exactly half the distance between the image points IP1' and IP3'. The reflected path of the image space light rays shows that all three image points have been shifted anti-parallel to N by a distance that is twice d1-d2, and that the image point I3' is exactly coincident with the linear array LA.

Again, it must be noted that in actual fact some of the image point light rays are lost to the image plane IP'. As illustrated some of the rays contributing to I1' do not reach IP'. The gray line shown indicates where one I1' ray would have converged had it not missed striking M1 initially instead of converging to point P1' shown. Again, however, these rays would not contribute to light detection at LA, and so the loss is irrelevant.

The description and the drawings include light rays tracing from the upper half of a full set of object points, assuming that the optical system is viewing the center of an object. Lack of inclusion of other object points is solely to maintain clarity and comprehensibility of disclosure. It has been found that movement of the k-mirror assembly in a direction parallel to N will result in exactly the same type of image shift in the N-direction.

The proof of the concept of the present linear optical scanning device may be found by simple geometric ray tracing of light rays reflected from the three mirrors of the k-mirror assembly. Modern computer automated design (CAD) software programs may be used to model the system with almost any degree of accuracy desired. The limitation is only dependent on the inherent accuracy of the software. Such modeling shows that given a perfect lens, perfect construction of the k-mirror, and perfect mechanical translation mechanism, the image shift is always exactly equal to twice the k-mirror shift, and there is no defocus whatsoever at the image plane.

The present invention obviates the need for correction because the scan errors do not occur. Furthermore, the scanning may be achieved with a relatively small, low mass mechanism. Such a feature provides significant advantage over the previously described method of mechanically translating the object or the camera and lens.

Furthermore, other prior art devices that produce "flat field" linear scanning require either complex cam and rack mechanisms designed for a specific application, such as, for example, U.S. Pat. No. 5,058,968 to Stark, or are limited to object space telecentric imaging that is not suited for large object scanning, U.S. Pat. No. 4,647,144, to Finkel. Also, in these cases, the corresponding mechanisms are not suited for simple, broad use with a wide variety of lenses.

In the preferred embodiment of the present invention, a three-mirror k-mirror configuration as has been shown, with the angles between M1 and the optical axis being 150 degrees, the angle between M3 and the optical axis being −150 degrees, and the angle between M2 and the optical axis being zero degrees. Other angles and other configurations are possible, including those with an odd number of mirrors greater than 3. The described simple k-configuration, however, appears to require the least amount of optical path length, thus making it more suited for use with a broader range of lenses.

Further, the preferred embodiment of the present invention allows for use of the linear optical scanning device with lenses that have relatively long back focal lengths. Because of the optical path length that even simple multi-mirror arrangements require, longer back focal lengths are preferred.

The preferred embodiment of the present invention also utilizes a lens that provides flat-field imaging and low optical distortion. The linear optical scanning device itself is capable of perfect linear performance with no focus error. Therefore, a lens that does not produce a flat field and low distortion (non-linear imaging) in the first place defeats some of the purposes of the linear optical scanning device. Two examples of good lenses for use with the linear optical scanning device are high quality photographic objectives, and photographic enlarger lenses.

Additionally, the preferred embodiment of the present invention utilizes lenses operated at relatively high F-number/small numeric aperture settings. As the working F-number of the lens decreases, the solid angle of cones of light coming from the exit pupil of the lens increases. As this occurs, the scanner mirror assembly must be made larger in order to collect all the useable light and prevent vignetting. Enlarging the scanner mirror assembly will tend to negate the advantage of having a compact linear optical scanning device design. Furthermore, additional mechanical path length is required for larger mirror assemblies.

The preferred embodiment of the present invention further utilizes a highly linear mechanical motion of the k-mirror assembly. Again, the image motion is exactly twice that of the mechanical motion. Any mechanical errors will be reflected in the image motion, and with twice the magnitude. It is understood, however, that there may be applications in which nonlinear image motion is desired.

In order to prevent stray or direct light from reaching the image plane, light blocking baffles should be used in conjunction with the k-mirror assembly.

For broadest utility, the linear optical scanning device should be housed in an enclosure that allows easy use with a variety of lens types and focal lengths, as well as a variety of camera types.

Figure 7:
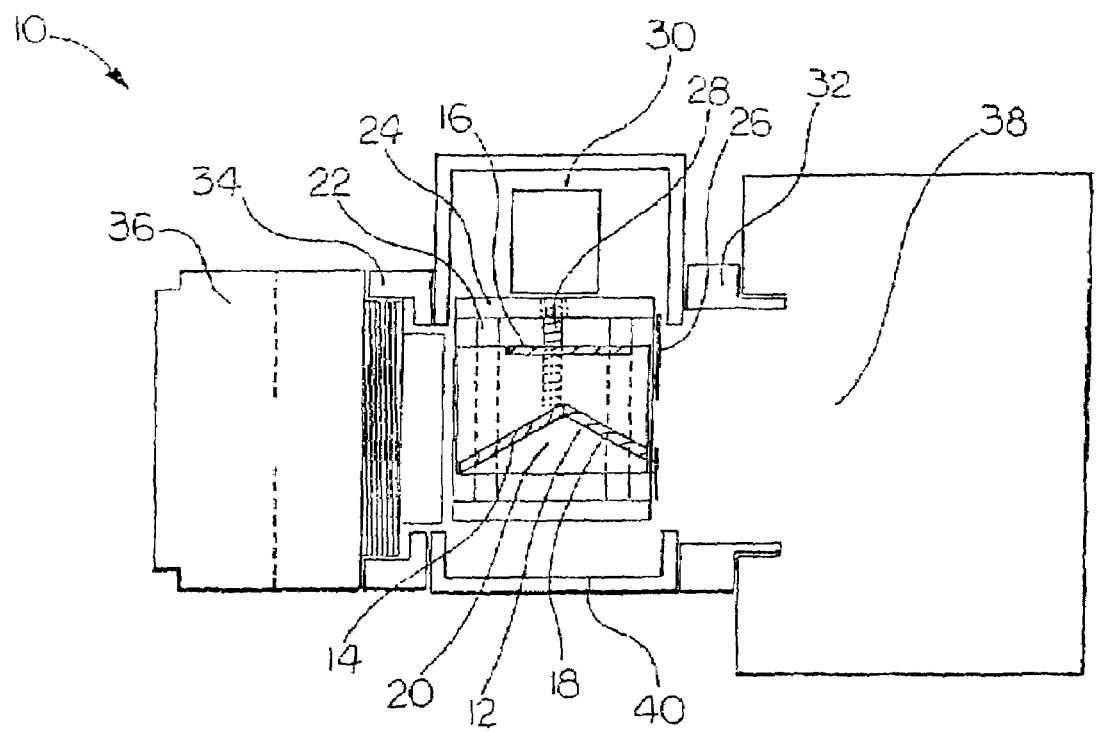
FIG. 7 is a plan view of a linear array camera incorporating the features of the present invention.

Referring now to FIG. 7, there is shown generally at 10 a linear array camera illustrating a preferred embodiment of the present invention. The linear array camera 10 includes a linear optical scanner 12 having a first mirror 14, a second mirror 16, and a third mirror 18 disposed on a mounting plate 20. The mounting plate 20 is operatively disposed on a plurality of slide rails 22. The plurality of slide rails 22 are disposed on a frame 24 and slidingly disposed on the mounting plate 20. Additionally, a plurality of light baffles 26 are disposed on the mounting plate 20. A drive screw 28 is centrally disposed in the frame 24 and rotatably connected to the mounting plate 20. A drive means 30 is disposed on the drive screw 28. A camera adapter means 32 is disposed adjacent to the frame 24. A camera lens adapter 34 is disposed adjacent to the frame 24 opposite the camera adapter means 32. A camera lens 36 is disposed within the camera lens adapter 34. A linear array of one-dimensional photo-detectors 38 is disposed adjacent to the camera adapter means 32 and opposite the frame 24. The linear array camera 10 is further disposed within the hollow interior of a housing 40.

While specification has been made to a screw drive means, it will be understood that the other drive means may be satisfactorily employed. The drive means may consist of a stepper motor, servomotor or any other rotating motor coupled to a drive screw that moves the mirror assembly. A rotating motor may also drive a rack and pinion arrangement, or a direct contact cam whose shape is designed to convert rotary motion into linear motion. One such possible cam shape is the so-called "Spiral of Archimedes". Direct linear drives may also be employed. Such drives may include linear motors in which the otherwise conventional stator and rotor are "unwrapped" into straight lines, direct linear piezo-electric actuators, voice coil actuators, or any other type of linear actuator such as solenoids or even pneumatic or hydraulic cylinders.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:

1. A linear optical scanner comprising:
    a mirror assembly having an optical axis, said assembly including three mirrors arranged in an Abbe K-configuration;
    a lens having an optical axis and a spaced apart image plane wherein said mirror assembly is disposed parallel to the optical axis of said lens such that light rays passing through said lens and through said mirror assembly produce an image at an image plane;
    a linear detector having a linear axis and being disposed at the image plane; and
    drive means operatively connected to said mirror assembly for effecting mechanical translation of said mirror assembly in a direction perpendicular to the optical axes of both said mirror assembly and said lens and perpendicular to the linear axis of said linear detector so as to result in translation of the image.

2. The invention of claim 1 wherein the linear axis of said linear detector is perpendicular to the optical axis of said lens.

3. The invention of claim 1 wherein the light rays passing through said lens are reflected off of a reflective surface of each mirror of said mirror assembly prior to converging to form an image at the image plane.

4. The invention of claim 1 wherein the velocity of translation of the image equals twice the velocity of translation of said mirror assembly.

5. The invention of claim 1 wherein the focus of the light rays passing through said lens remains constant during translation of said mirror assembly.

6. In a linear optical scanner having a mirror assembly with an optical axis, the improvement comprising:
    said mirror assembly having an odd number of mirrors greater than three
    a lens having an optical axis and a spaced apart image plane wherein said mirror assembly is disposed parallel to the optical axis of said lens such that light rays passing through said lens and through said mirror assembly produce an image at an image plane;
    a linear detector having a linear axis, said linear detector being disposed at the image plane; and
    drive means operatively connected to said minor assembly for effecting mechanical translation of said mirror assembly in a direction perpendicular to the optical axes of both said mirror assembly and said lens and perpendicular to the linear axis of said linear detector so as to result in translation of the image.

7. The invention of claim 6 wherein the linear axis of said linear detector is perpendicular to the optical axis of said lens.

8. The invention of claim 6 wherein the light rays passing through said lens are reflected off of a reflective surface of each mirror of said mirror assembly prior to converging to form an image at the image plane.

9. The invention of claim 6 wherein the velocity of translation of the image equals twice the velocity of translation of said mirror assembly.

10. The invention of claim 6 wherein the focus of the light rays passing through said lens remains constant during translation of said mirror assembly.

11. In a linear optical scanner system comprising a mirror assembly with an optical axis, said mirror assembly having three mirrors arranged in an Abbe K-configuration, and a lens having an optical axis and a spaced apart image plane, said mirror assembly being disposed parallel to the optical axis of said lens such that light rays passing through the lens and mirror assembly produce an image at an image plane, and wherein a linear detector with a linear axis is disposed at the image plane, the improvement wherein the mirror assembly is translated in a direction perpendicular to the optical axes of the mirror assembly and the lens and perpendicular to the linear axis of the linear detector so as to result in the translation of the image, the velocity of translation of the image being twice the velocity of the translation of the mirror assembly.

12. The invention of claim 11 wherein the linear axis of said linear detector is perpendicular to the optical axis of said lens.

13. The invention of claim 11 wherein the light rays passing through said lens are reflected off of a reflective surface of each mirror of said mirror assembly prior to converging to form an image at the image plane.

14. The invention of claim 11 wherein the focus of the light rays passing through said lens remains constant during translation of said mirror assembly.

* * * * *